United States Patent
Bruen (10) Patent No.: US 8,793,318 B1
(45) Date of Patent: Jul. 29, 2014

(54) SYSTEM AND METHOD FOR IDENTIFYING AND REPORTING IMPROPERLY REGISTERED WEB SITES

(76) Inventor: Garth Bruen, Brookline, MA (US)

( * ) Notice: Subject to any disclaimer, the term of this patent is extended or adjusted under 35 U.S.C. 154(b) by 1242 days.

(21) Appl. No.: 12/135,649

(22) Filed: Jun. 9, 2008

Related U.S. Application Data (60) Provisional application No. 60/942,695, filed on Jun. 8, 2007.

(51) Int. Cl.
  G06F 15/16 (2006.01)
(52) U.S. Cl.
  USPC .......................................................... 709/206
(58) Field of Classification Search
  USPC .......................................................... 709/206
  See application file for complete search history.

(56) References Cited

U.S. PATENT DOCUMENTS

| | | | |
|---|---|---|---|
| 7,620,690 B1 * | 11/2009 | Castelli ......................... | 709/206 |
| 7,647,376 B1 * | 1/2010 | Jagger et al. ................. | 709/206 |
| 2005/0060643 A1 * | 3/2005 | Glass et al. ................. | 715/501.1 |
| 2006/0168065 A1 * | 7/2006 | Martin ......................... | 709/206 |
| 2007/0143469 A1 * | 6/2007 | Adams et al. ................. | 709/224 |
| 2007/0180031 A1 * | 8/2007 | Stern et al. .................... | 709/206 |
| 2008/0005312 A1 * | 1/2008 | Boss et al. .................... | 709/224 |
| 2008/0034211 A1 * | 2/2008 | Shull et al. .................... | 713/175 |
| 2010/0281535 A1 * | 11/2010 | Perry et al. ..................... | 726/22 |

OTHER PUBLICATIONS

McCormick, R.P. et al., spamcop.net [SpamCop-List], messages dated Aug. 23-25, 2003, 4 pages.*

* cited by examiner

Primary Examiner — Oleg Survillo
(74) Attorney, Agent, or Firm — Hayes Soloway P.C.

(57) ABSTRACT

A method for identifying and reporting improperly registered web sites includes receiving unwelcome mail. A Universal Resource Locator for the unwelcome mail is extracted. A database for ownership data for the extracted Universal Resource Locator is queried. The ownership data includes an owner email address for an owner of the extracted Universal Resource Locator. A message is sent to the owner email address requesting a stop to the unwelcome mail. If the message is rejected, the rejection is indicative of invalid ownership data. Thereafter, the invalid ownership data and the Universal Resource Locator is reported to the proper authority.

8 Claims, 9 Drawing Sheets

Whois Domain Name Lookup at Register.com | Find Who Registered a Website    Page 2 of 3

WHOIS
database. Network Solutions reserves the right to terminate your access to the WHOIS
database in its sole discretion, including without limitation, for excessive querying of the WHOIS database or for failure to otherwise abide by this policy.
Network Solutions reserves the right to modify these terms at any time.

Get a FREE domain name registration, transfer, or renewal with any annual hosting package
- or just $8.95 with monthly packages.

http://www.networksolutions.com

Visit AboutUs.org for more information about HAYES-SOLOWAY.COM
AboutUs: HAYES-SOLOWAY.COM Registrant:
Hayes Soloway
3450 E. Sunrise Drive
Suite 140
Tucson, AZ 85718
US Domain Name: HAYES-SOLOWAY.COM Administrative Contact:
Bronson, Shauna sbronson@HAYES-SOLOWAY.COM
Hayes Soloway PC
3450 E. Sunrise Drive
Suite 140
Tucson, AZ 85718
US
(520) 882-7623 fax: 520-882-7643

Technical Contact:
Network Solutions, LLC. customerservice@networksolutions.com
13861 Sunrise Valley Drive
Herndon, VA 20171
US
1-888-642-9675 fax: 571-434-4620

Record expires on 25-Oct-2010.
Record created on 25-Oct-1999.
Database last updated on 6-Jun-2007 13:37:18 EDT.

Domain servers in listed order:

NS7.WORLDNIC.COM 205.178.190.4
NS8.WORLDNIC.COM 205.178.189.4

SYSTEM AND METHOD FOR IDENTIFYING AND REPORTING IMPROPERLY REGISTERED WEB SITES

CROSS-REFERENCE TO RELATED APPLICATION

This application claims priority to U.S. Provisional application entitled, "System and Method for Identifying and Reporting Improperly Registered Web Sites," having Ser. No. 60/942,695, filed Jun. 8, 2007, which is entirely incorporated herein by reference.

FIELD OF THE INVENTION

The present invention is generally related to policing web site registrations and more particularly is related to software for the automated identification and reporting of improperly registered web sites.

BACKGROUND OF THE INVENTION

Figure 1:
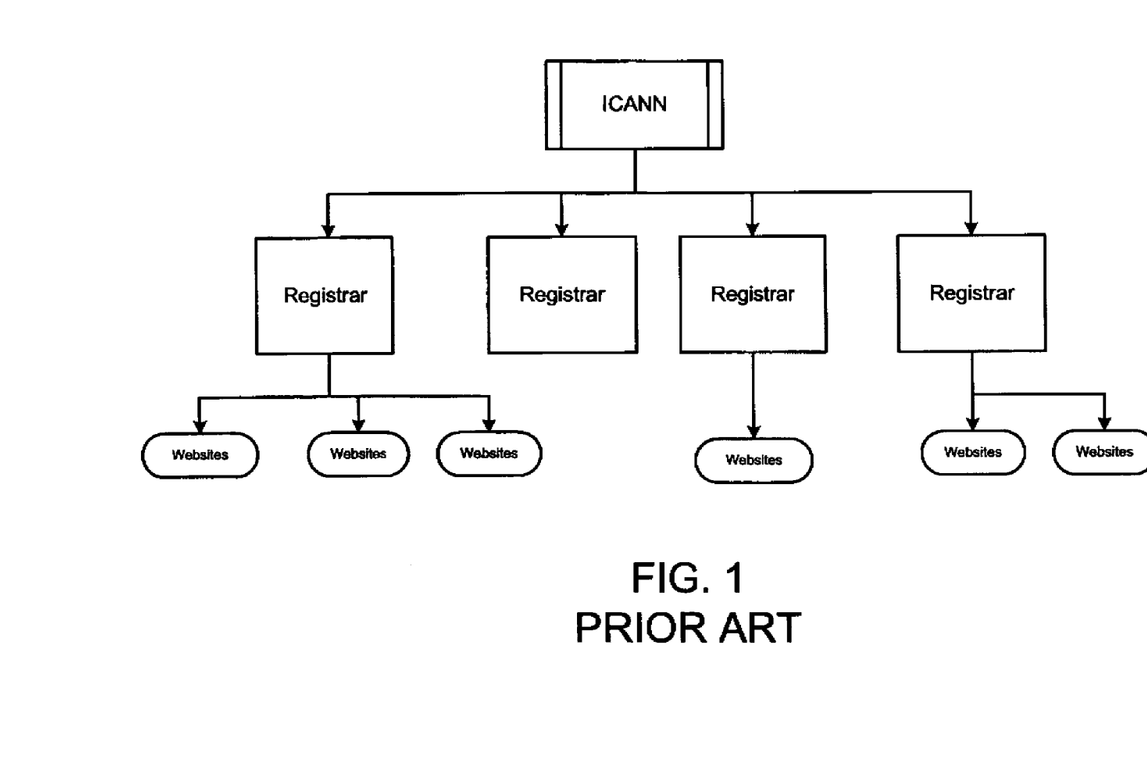
FIG. 1 is a schematic representation of web site hierarchy, in accordance with the prior art.

FIG. 1 is a schematic representation of web site hierarchy, in accordance with the prior art. ICANN has been certifying Registrars since the inception of the current structure of the public Internet. This allows the Registrars to establish domain registrations for customers. The Registrars pay a fee to ICANN for each web site registered. As part of the arrangement Registrars are responsible for maintaining accurate registration records from all of their customers. Because there has been no enforcement or incentives for the Registrars to fulfill their responsibilities, the registration records are regularly inaccurate. In the best cases, Registrars have not maintained accurate records because it would constitute a resource burden that cannot be justified in the budget. In the worst cases some Registrars are thought to be fronts for online criminals. In short, the current structure has failed in the sense that online criminals can act with impunity.

Thus, a heretofore unaddressed need exists in the industry to address the aforementioned deficiencies and inadequacies.

SUMMARY OF THE INVENTION

Embodiments of the present invention provide a system and method for identifying and reporting improperly registered web sites. Briefly described, in architecture, one embodiment of the system, among others, can be implemented as follows. The system contains a first portion of software code for receiving unwelcome mail. A second portion of software code extracts a Universal Resource Locator for the unwelcome mail. A third portion of software code queries a database for ownership data for the extracted Universal Resource Locator. The ownership data including an owner email address for an owner of the extracted Universal Resource Locator. A fourth portion of software code sends a message to the owner email address requesting a stop to the unwelcome mail.

The present invention can also be viewed as providing methods for identifying and reporting improperly registered web sites. In this regard, one embodiment of such a method, among others, can be broadly summarized by the following steps: receiving unwelcome mail; extracting the Universal Resource Locator for the unwelcome mail; querying a database for ownership data for the extracted Universal Resource Locator, the ownership data including an owner email address for an owner of the extracted Universal Resource Locator; and sending a message to the owner email address requesting a stop to the unwelcome mail.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 2:
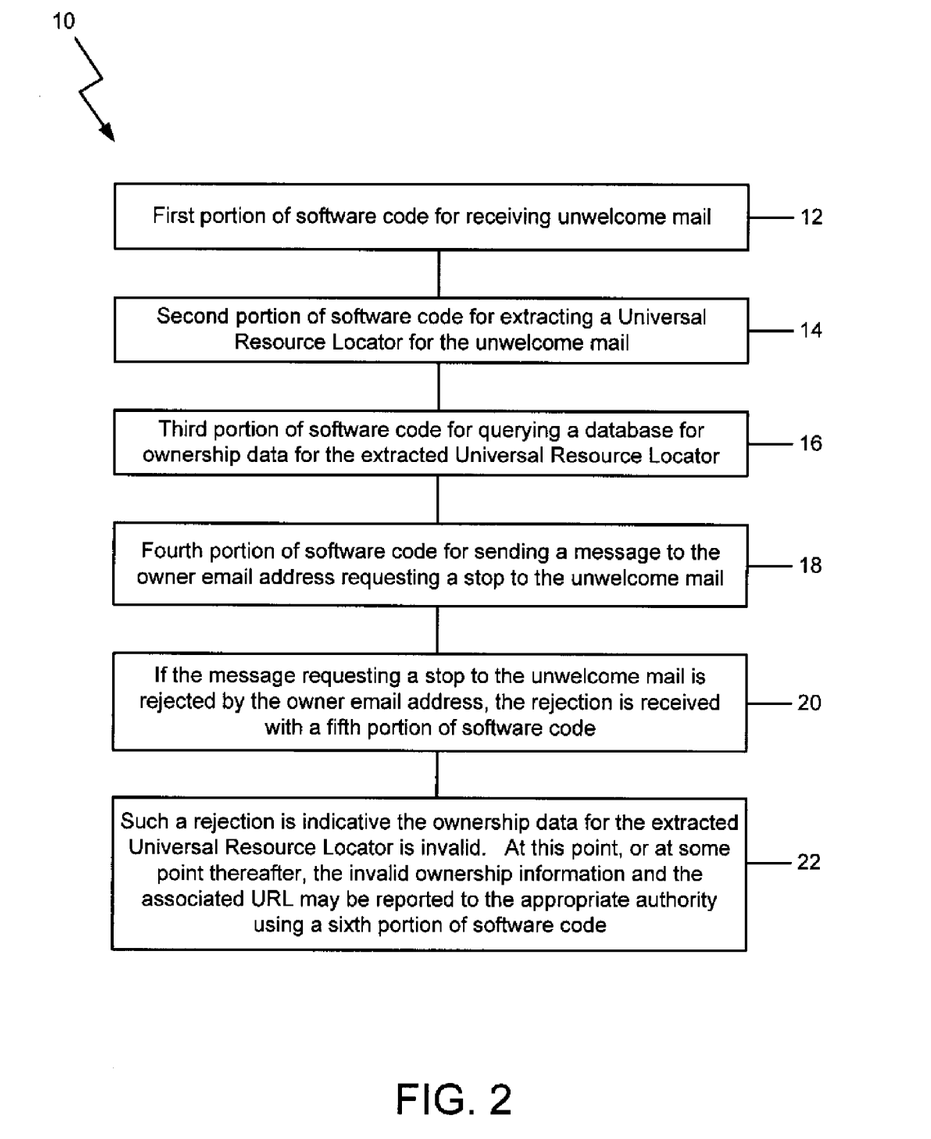
FIG. 2 is a flow chart for a software system for identifying and reporting improperly registered web sites, in accordance with a first exemplary embodiment of the present invention.

FIG. 2 is a flow chart for a software system 10 for identifying and reporting improperly registered web sites, in accordance with a first exemplary embodiment. The software system 10 contains a first portion of software code 12 for receiving unwelcome mail. A second portion of software code 14 extracts a Universal Resource Locator for the unwelcome mail. A third portion of software code 16 queries a database for ownership data for the extracted Universal Resource Locator. The ownership data including an owner email address for an owner of the extracted Universal Resource Locator. A fourth portion of software code 18 sends a message to the owner email address requesting a stop to the unwelcome mail.

The software system 10 may be operated from a basic computer having input and output devices, a connection to the Internet, and memory. The first portion of software code 12 reviews unwelcome mail to identify the sender. While not as efficient, the first portion of software code 12 may simply receive a source email address manually entered or pasted into a field used by the first portion of software code 12. More efficiently, the first portion of software code 12 may receive unwelcome mail through electronic mail. Mail may be determined to be unwelcome through automated means (several commercially available software packages automatically identify spam or undesirable solicitations) or a user may take mail that is personally determined to be unwelcome and electronically transmit it or a copy thereof to the first portion of software code 12.

The second portion of software code 14 extracts a Universal Resource Locator ("URL") for the unwelcome mail. The second portion of software code 14 may include an investigatory software code for overcoming attempts to disguise the Universal Resource Locator. Various attempts to obfuscate URLs may be made through the use of hexadecimal codes, the insertion of nonsense or null characters, and the use of pure Internet Protocol (IP) addresses. The present invention may be more effective if it is able to overcome these obfuscation attempts using de-obfuscation processes known to those having ordinary skill in the art.

Figure 3:
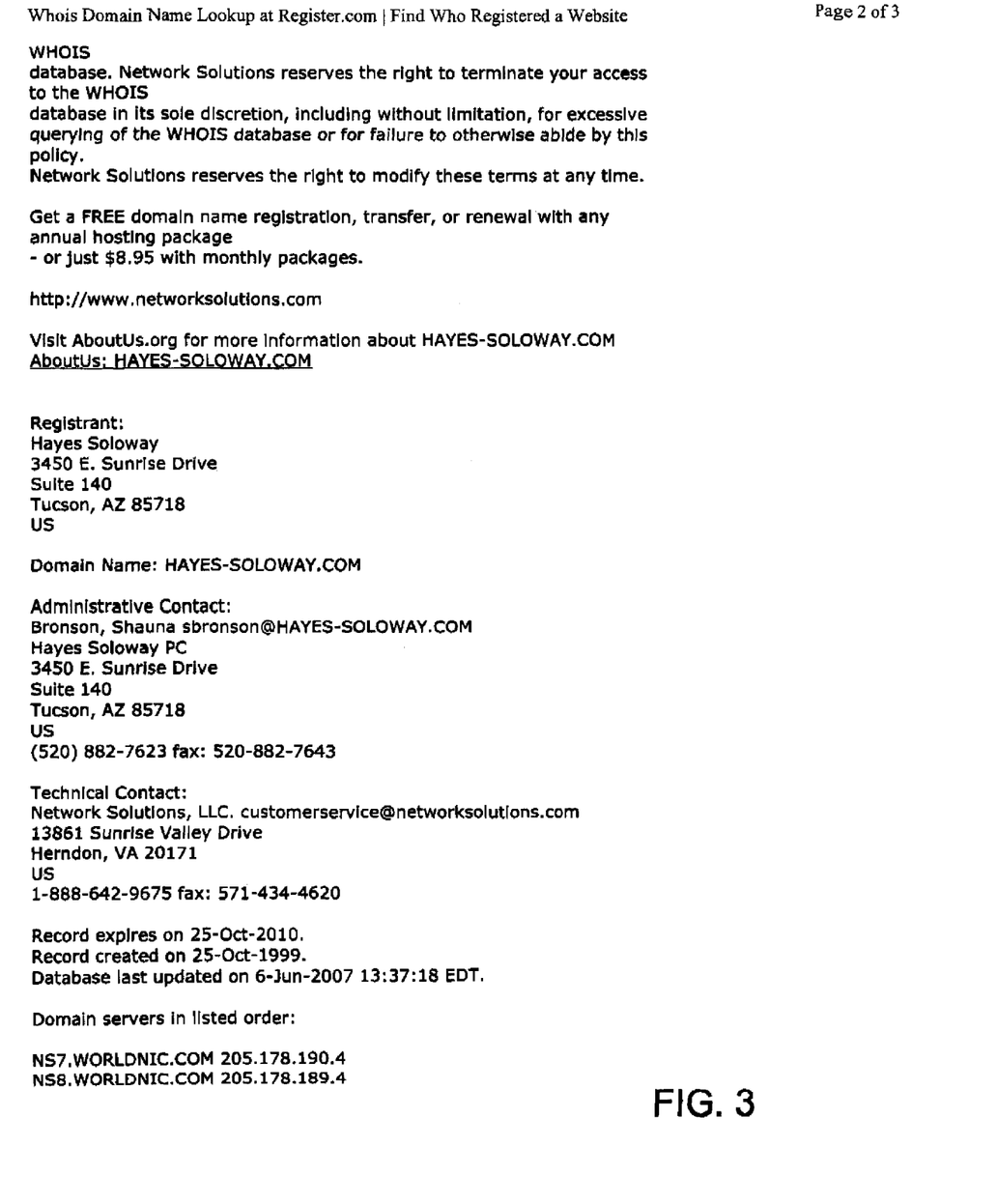
FIG. 3 is an exemplary Whois registration page.

The third portion of software code 16 queries a database for ownership data for the extracted Universal Resource Locator. The database may be a public Whois database. FIG. 3 is an exemplary Whois registration page. The database may be something stored on the memory of the computer operating the software system 10 or may be one or more remotely located databases. The database may also be an amalgamation of some or all of these resources, local and/or remote, public and/or private. The database may maintain information regarding previous senders of unwelcome mail and the software system 10 may use that information to determine if the unwelcome mail is coming from a known source of unwelcome mail. If the source of the unwelcome mail is a known source that has previously been contacted and/or reported to a proper authority, the third portion of software code 16 may interrupt or abort the process described herein and report this information to a user.

A fourth portion of software code 18 sends a message to the owner email address requesting a stop to the unwelcome mail. If the message is received by the owner email address, the process may stop. Receipt of the message by the owner email address may be recorded in a database to monitor for further unwelcome email from the owner email address. If the message requesting a stop to the unwelcome mail is rejected by the owner email address, the rejection is received with a fifth portion of software code 20. Such a rejection is indicative the ownership data for the extracted Universal Resource Locator is invalid. At this point, or at some point thereafter, the invalid ownership information and the associated URL may be reported to the appropriate authority using a sixth portion of software code 22.

The entire software system 10 described in accordance with the first exemplary embodiment of the present invention may be automated from receipt of the unwelcome email to filing a report with the appropriate authority. Similarly, one or more steps may contain interruptions for manual intervention and all such permutations of the software system 10 in this regard are considered to be within the scope of the present invention. The software system 10 may also involve additional steps for following up with the appropriate authority to make certain action is taken with regards to the invalid ownership information. Reporting of this invalid ownership information regularly results in a cancellation of the ownership.

Figure 4:
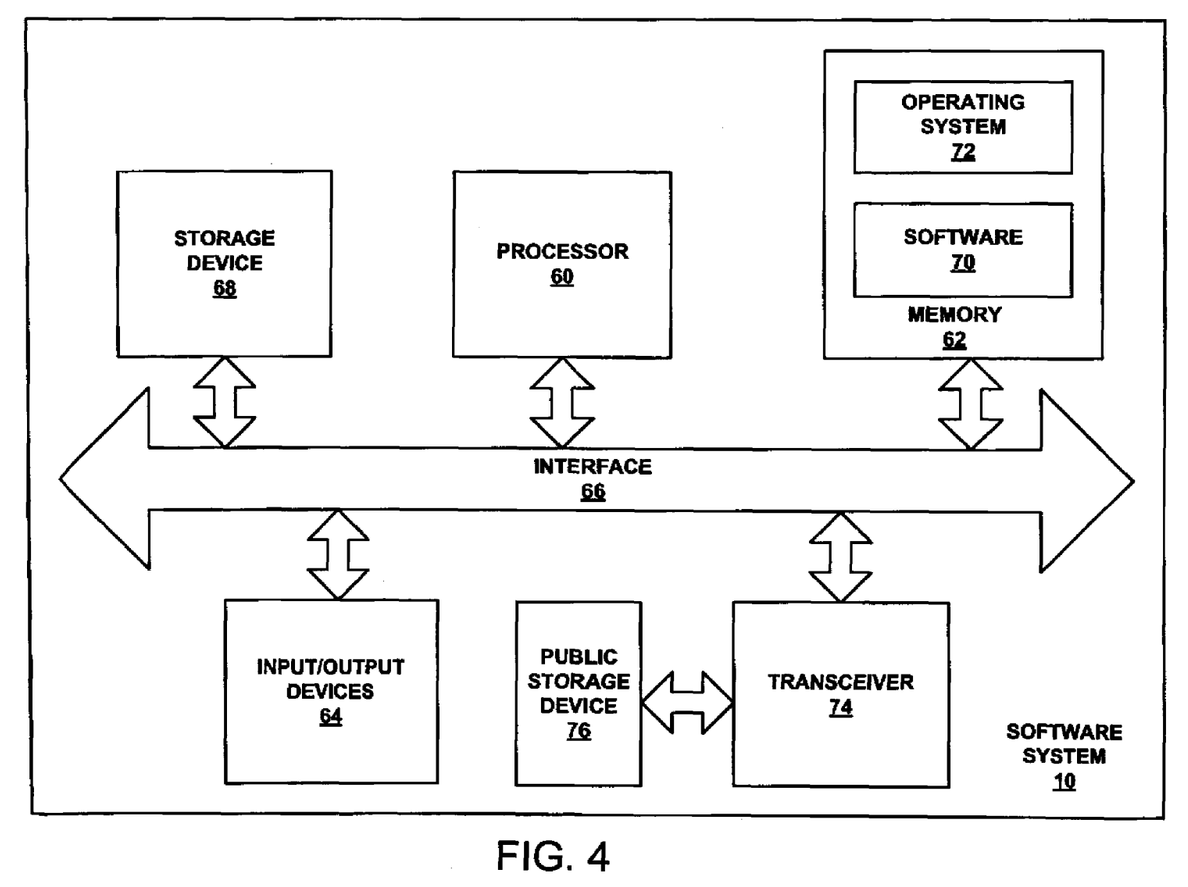
FIG. 4 is a block diagram illustration of the software system of FIG. 2, in accordance with the first exemplary embodiment of the present invention.

FIG. 4 is a block diagram illustration of the software system 10 of FIG. 2, in accordance with the first exemplary embodiment of the present invention. The operation of certain embodiments of the present invention can be implemented in hardware, software, firmware, or a combination thereof. In the currently contemplated best mode, the software system 10 is implemented partially in hardware and partially in software, as an executable program, and is executed by a special or general purpose digital computer, such as a personal computer (PC; IBM-compatible, Apple-compatible, or otherwise), workstation, minicomputer, handheld computer, mainframe computer, or similar device. FIG. 4 illustrates the software system 10 as a general purpose computer that can perform functions of the software system 10 as defined herein.

Generally, in terms of hardware architecture, as shown in FIG. 4, the software system 10 includes a processor 60, a memory 62, and one or more input and/or output (I/O) devices 64 (or peripherals) that are communicatively coupled via a local interface 66. The local interface 66 can be, for example but not limited to, one or more buses or other wired or wireless connections, as is known in the art. The local interface 66 may have additional elements, which are omitted for simplicity, such as controllers, buffers (caches), drivers, repeaters, and receivers, to enable communications. Further, the local interface 66 may include address, control, and/or data connections to enable appropriate communications among the aforementioned components.

The software system 10 also contains a storage device 68 for storing data therein. As an example, in accordance with the first exemplary embodiment of the invention, the data may include previous URL owners identified, general URL information, previous messages sent to URL owners, etc. Further discussion of this data, in addition to the process of using such data, is provided herein.

The processor 60 is a hardware device for executing software 70, particularly that stored in the memory 62. The processor 60 can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions.

The memory 62 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 62 may incorporate electronic, magnetic, optical, and/or other types of storage media. Note that the memory 62 can have a distributed architecture, where various components are situated remote from one another, but can be accessed by the processor 60.

The software 70 in the memory 62 may include one or more separate programs, each of which comprises an ordered listing of executable instructions for implementing logical functions. In the example of FIG. 2, the software 70 in the memory 62 defines the functionality performed by the software system 10 in accordance with the network. The software 70 may include one or more portions of the software code 12, 14, 16, 18, 20, 22. A suitable operating system (O/S) 72 may also be stored within the memory 62. A nonexhaustive list of examples of suitable commercially available operating systems 134 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; and (e) a LINUX operating system, which is freeware that is readily available on the Internet. The operating system 134 essentially controls the execution of other computer programs, such as that defined by the software 70 of the software system 10, and provides scheduling, input-output control, file and data management, memory management, and communication control and related services.

The I/O devices 64 may include input devices, for example but not limited to, a keyboard, mouse, scanner, microphone, or other input devices. Furthermore, the I/O devices 64 may also include output devices, for example but not limited to, a printer, display, or other output devices. Finally, the I/O devices 64 may further include devices that communicate both inputs and outputs, for example but not limited to, a modulator/demodulator (modem; for accessing another device, system, or network), a radio frequency (RF) or other transceiver, a telephonic interface, a bridge, a touch screen, a router, or other communication devices.

The software system 10 also contains a transceiver 74 that is capable of transmitting and receiving signals from other computing systems. More specifically, the transceiver may be capable of accessing and retrieving information from third party or public storage devices 76 containing URL data or other useful data. In accordance with the first exemplary embodiment of the invention, the transceiver 74 is capable of high speed, high bandwidth data communication.

When the software system 10 is in operation, the processor 60 is configured to execute the software 70 stored within the memory 62, to communicate data to and from the memory 62, and to generally control operations of the software system 10 pursuant to the software 70, as defined herein. The software 70 and the O/S 72, in whole or in part, but typically the latter, are read by the processor 60, perhaps buffered within the processor 60, and then executed.

When the software system 10 is implemented in software, it should be noted that the software system 10 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The software system 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 5:
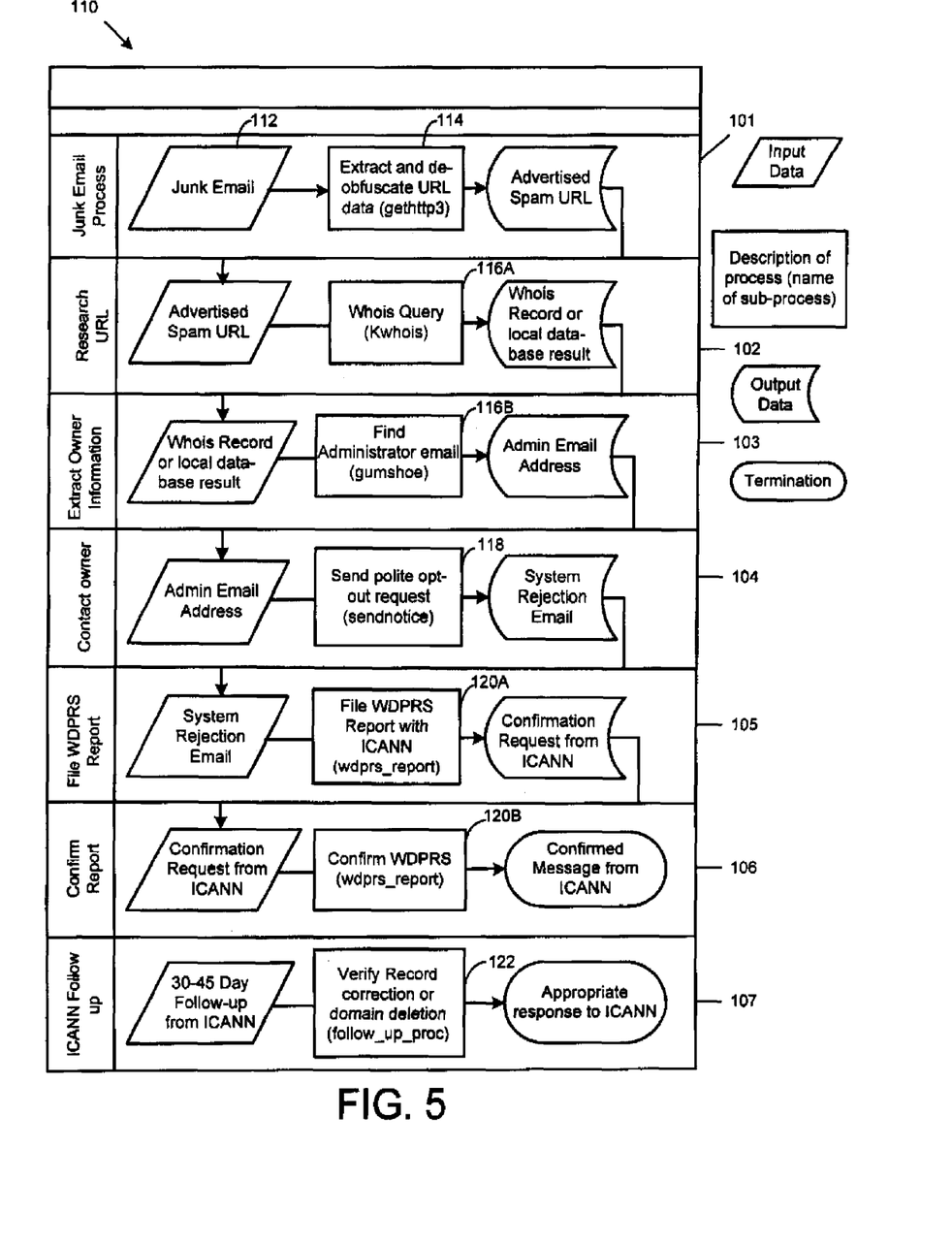
FIG. 5 is a flow chart for a software system for identifying and reporting improperly registered web sites, in accordance with a second exemplary embodiment of the present invention.

FIG. 5 is a flow chart for a software system 110 for identifying and reporting improperly registered web sites, in accordance with a second exemplary embodiment. The process for utilizing the software system 110 begins with clients or users submitting junk email samples. Once collected they are processed by gethttp3.vbs. All processes are built for the Microsoft Windows platform, although other platforms may be utilized and such platforms are also considered to be within the scope of the present invention.

Line 101 shows junk email being received 112. The junk email is input into a script titled gethttp3 114. Gethttp3 114 is a script written in Visual Basic (although other programming languages are considered to be within the scope of the present invention). Gethttp3 114 examines the text of source of email messages and extracts Universal Resource Locators (URLs), or domain names as they would appear in an HTML document, HTTP listing or Internet browser address bar. The gethttp3 114 script also removes various attempts obfuscate URLs through the use of hexadecimal codes, the insertion of nonsense or null characters, and the use of pure Internet Protocol (IP) addresses. The gethttp3 114 script also blocks the processing of "trusted sites" or domains that are frequently used in "spoofing" or "phishing" attacks. The gethttp3 114 script also sorts processed data by submitting client junk mail and presents this information to a central database, which may be private or public. The gethttp3 114 script can be manually or automatically triggered after email samples have been collected. The gethttp3 114 script outputs the URL.

Line 102 shows the URL from line 101 being input to a Kwhois 116A executable program, which outputs information to a gumshoe 116B executable program in line 103. Gumshoe 116B and Kwhois 116A are executable programs written in C++(although other programming languages are considered to be within the scope of the present invention). Gumshoe 116B looks at the URL data presented by gethttp3.vbs and queries a private database (e.g., one controlled by the user) to see if the URL (domain) already exists in the private database, if it does gumshoe 116B queries the private database for the owner information, skipping line 102. If the data does not yet exist in the private database the domain is passed to Kwhois 116A. Kwhois 116A is a command line program that queries various public Whois databases on the Internet and writes the results to flat files (text). These flat file Whois records are processed by gumshoe 116B and presented to the private database. Once the domain owner information is available in the private database it can be queried by the next process sendnotice 118. Gumshoe 116B and Kwhois 116A can be run manually or triggered by gethttp3 114.

Line 104 shows ownership information being input to sendnotice 118. Sendnotice 118 is a script written in Visual Basic (although other programming languages are considered to be within the scope of the present invention). Sendnotice 118 queries the private database for domain owner information. Sendnotice 118 formats email messages and presents them to Microsoft Outlook or Outlook express (or other similar email originating software) with specific opt-out information. The "To:" field is the email address of the domain owner identified through gumshoe 116B and Kwhois 116A. The "Subject" field is the URL or domain name and the message politely requests that the domain owner stop emailing one or more specifically identified email addresses. The identified email address(es) is(/are) inserted into the text of the message according to which clients/users happens to be processed by sendnotice 118 at the time. Sendnotice 118 can be run manually or triggered by gumshoe 116B. If the email originated in line 104 is not rejected, the software system 110 has completed processing.

Line 105 shows a rejected email input to wdprs_report 120A. Wdprs_report 120A is a script written in Visual Basic (although other programming languages are considered to be within the scope of the present invention). Wdprs_report 120A processes rejected emails to determine that domain owner contact emails are invalid. Wdprs_report 120A extracts domain names and email addresses from system rejected emails and updates the private database to indicate that the owner's email address is invalid. Wdprs_report 120A then passes the domain name and the contact information from the private database to an online ICANN sponsored reporting system called Whois Data Problem Reports(WD-PRS). Rather than displaying the results of this report in a browser window, the results are forced to a flat file, such as through an open-source standard program called GetWeb.exe. This flat file contains the second page of the WDPRS which displays the current Whois information for the reported site and unpopulated reporting fields. Wdprs_report 120A populates these fields with the appropriate inaccurate information and submits the final report to ICANN by launching the populated page in a browser window. As shown in Line 106, ICANN then sends a confirmation request email to the provided contact email address from the private database. These confirmation request emails are dumped, either manually or automatically, to a processing directory where wdprs_report 120B confirms the report by loading the confirmation URL provided in the ICANN message into a browser window. Wdprs_report 120B also updates the private database to indicate that this domain has current WDPRS report filed with ICANN. This process may be typically triggered manually.

Line 107 shows follow up_proc 122, which is a script written in Visual Basic (although other programming languages are considered to be within the scope of the present invention). Follow_up_proc 122 processes the follow-up reports sent by ICANN concerning WDPRS reports filed by wdprs_report 120 previously (usually after 30-45 days, although this period is arbitrary). During this time period, the domain owners are supposed to update their records. If the record still contains inaccurate information, the Registrar is supposed to disable the domain name, which makes it inaccessible on the Internet. Follow_up_proc 122 opens the follow up emails from ICANN, which should contain the current WHOIS record, and compares that data with data queried from the private database to see if invalid information is still present. If the record still contains invalid information the proper follow up URL provided in the follow up email is presented to a browser window by follow_up_proc 122, which files the follow up report with ICANN. Follow_up-_proc 122 also updates the private database indicating that the domain should be disabled by the Registrar.

Figure 6:
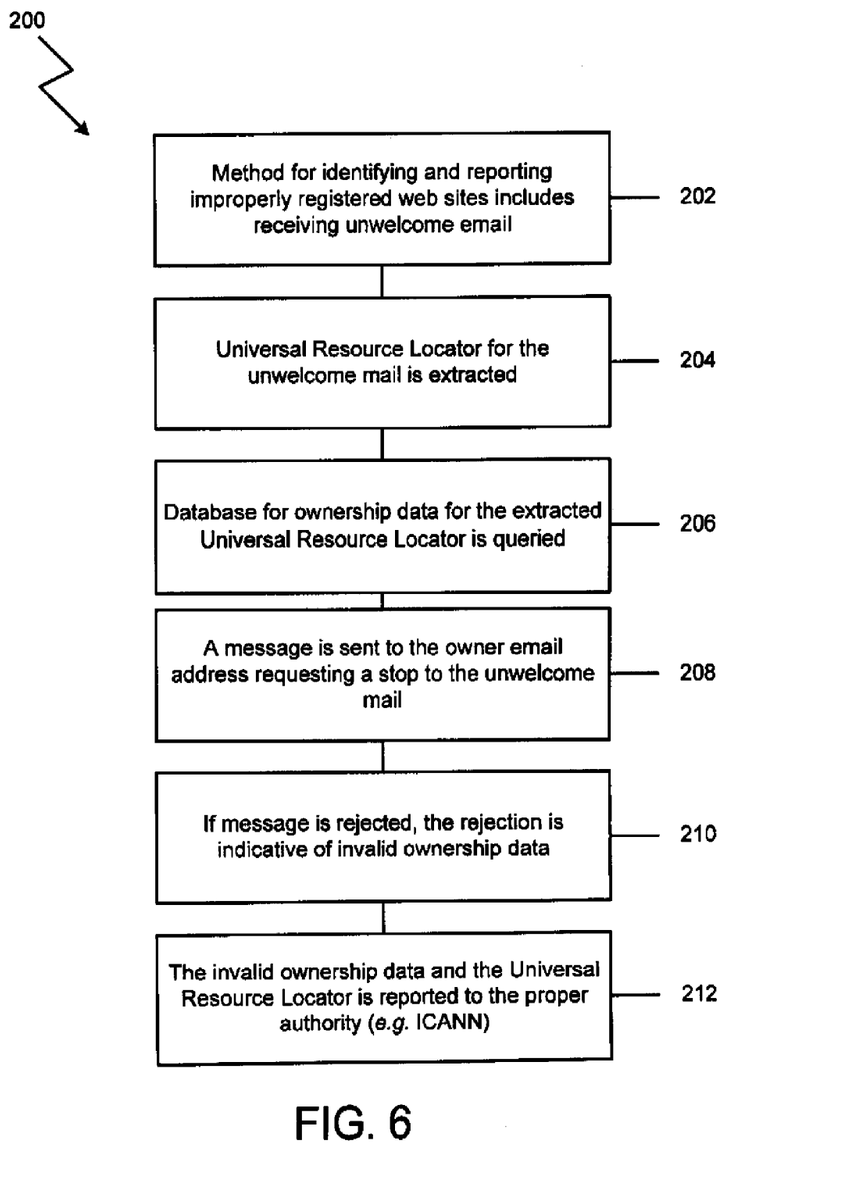
FIG. 6 is a flow chart for a method for identifying and reporting improperly registered web sites using the software system of FIG. 2, in accordance with the first exemplary embodiment of the present invention.

FIG. 6 is a flow chart for a method 200 for identifying and reporting improperly registered web sites using the software system 10 of FIG. 2, in accordance with the first exemplary embodiment of the present invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, the method for identifying and reporting improperly registered web sites includes receiving unwelcome mail. A Universal Resource Locator for the unwelcome mail is extracted (block 204). A database for ownership data for the extracted Universal Resource Locator is queried (block 206). The ownership data includes an owner email address for an owner of the extracted Universal Resource Locator. A message is sent to the owner email address requesting a stop to the unwelcome mail (block 208). If the message is rejected, the rejection is indicative of invalid ownership data (block 210). Thereafter, the invalid ownership data and the Universal Resource Locator is reported to the proper authority (e.g., ICANN) (block 212).

Figure 7A:
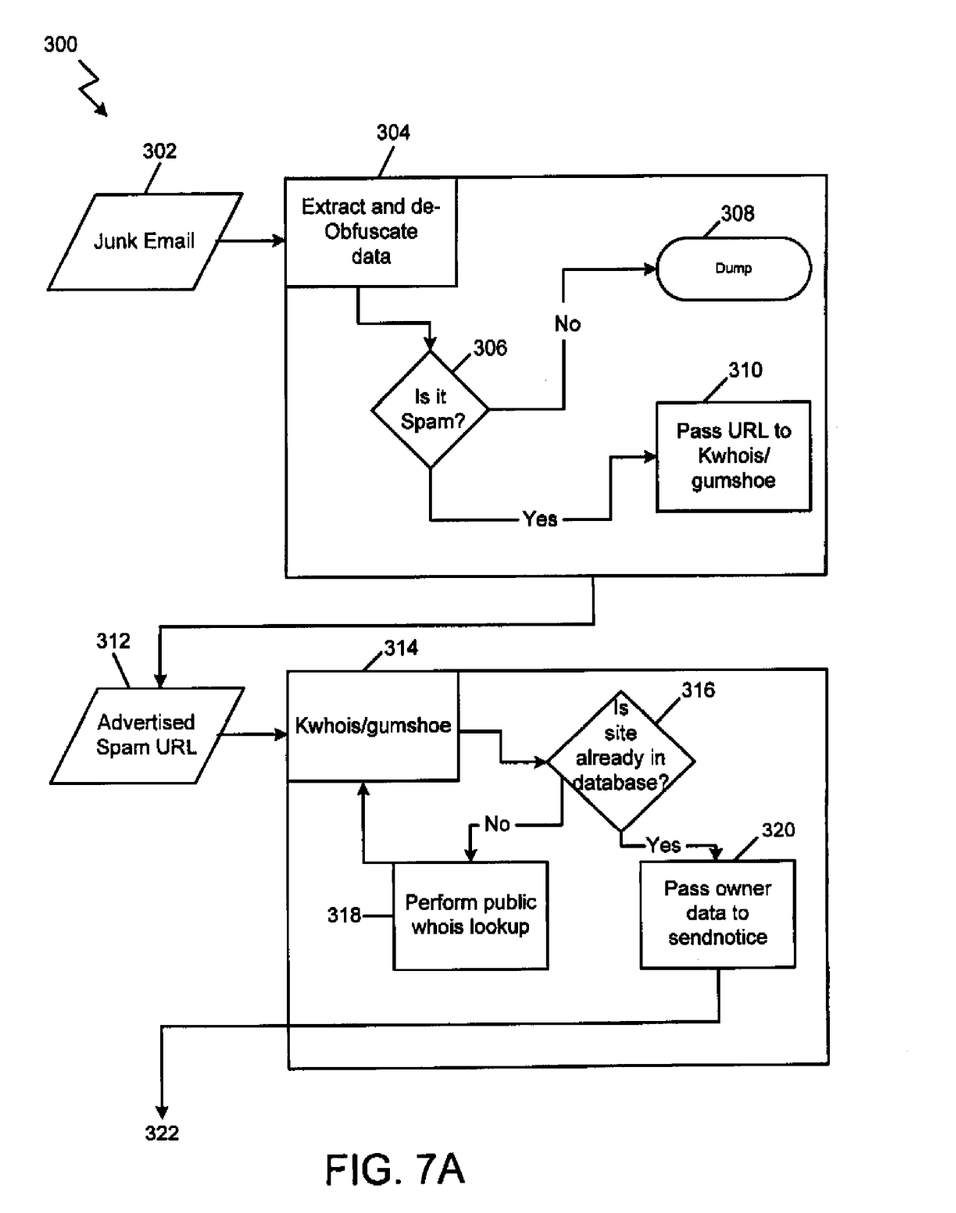
FIGS. 7A, B, and C are flow charts for a method for identifying and reporting improperly registered web sites using the software system of FIG. 5, in accordance with the second exemplary embodiment of the present invention.

FIG. 7A is a flow chart for a method 300 for identifying and reporting improperly registered web sites using the software system 110 of FIG. 5, in accordance with the second exemplary embodiment of the present invention. Junk email is received (block 302) and sent to the gethttp3 script for URL extraction (block 304). An analysis is performed of the junk email to determine if it is spam (block 306). If the junk email is not spam, it is dumped (block 308). If the junk email is spam, it is forwarded to gumshoe and Kwhois (block 310).

The spam URL is input (block 312) into the gumshoe and Kwhois executable programs (block 314). An analysis of the private database is performed to determine if the URL is in the private database (block 316). If the URL is not in the Private database, Kwhois looks up the URL in the Whois database and the URL and ownership information is saved to the private database (block 318). If the URL is in the private database, the owner information is passed on to sendnotice (block 320).

Figure 7B:
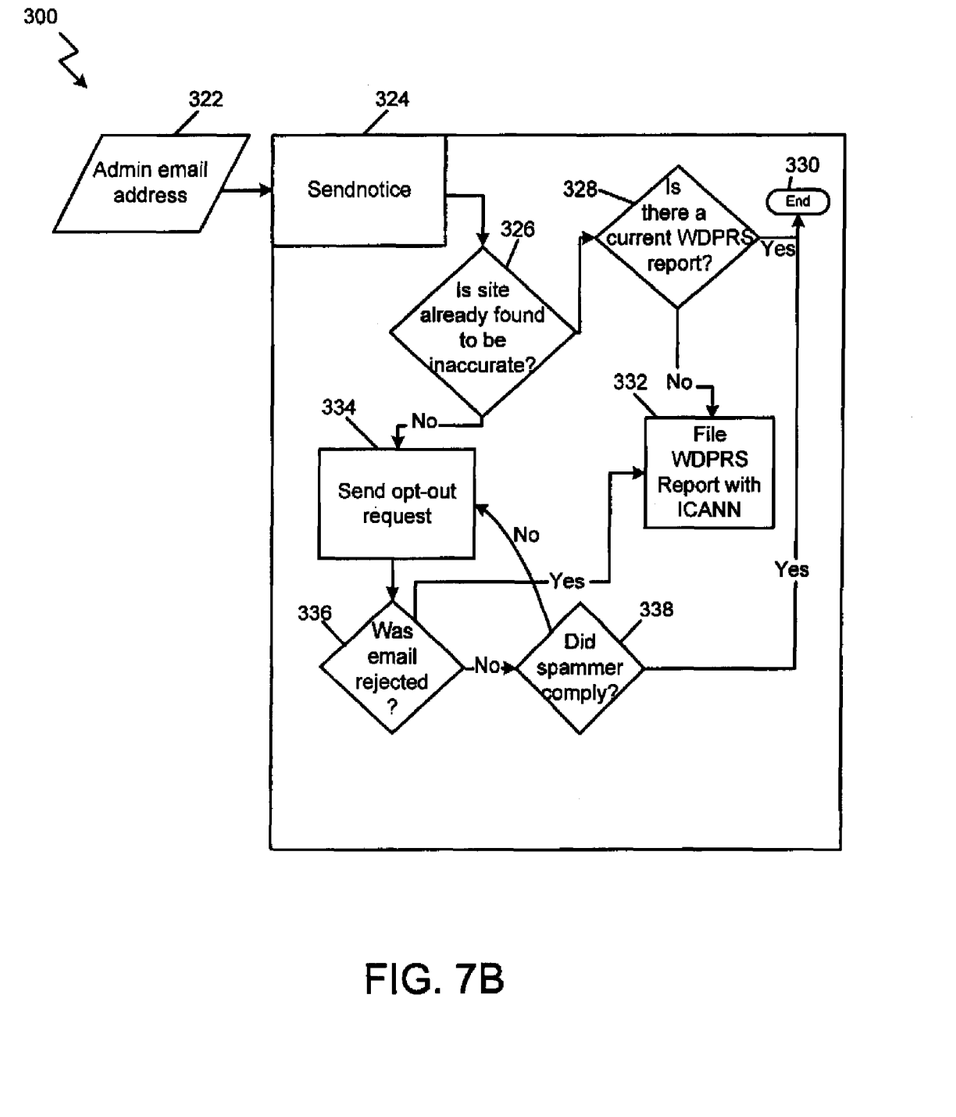

In FIG. 7B, the URL and spam owner address are input (block 322) to sendnotice (block 322). An analysis is performed on the accuracy of the owner address (block 324). If the owner address is found to be inaccurate (block 326), an analysis is performed to determine if the inaccuracy was reported (block 328). If the inaccuracy was reported, the process ends (block 330). If the inaccuracy was not reported, a report is filed (block 332). If, in response to the accuracy analysis (block 324), the owner address is not found to be inaccurate, an opt-out email is sent (block 334). If the opt-out email is rejected (block 336), a report is filed (block 332). If the opt-out email is accepted, compliance is checked (block 338) and failed compliance results in another opt-out email (block 334).

Figure 7C:
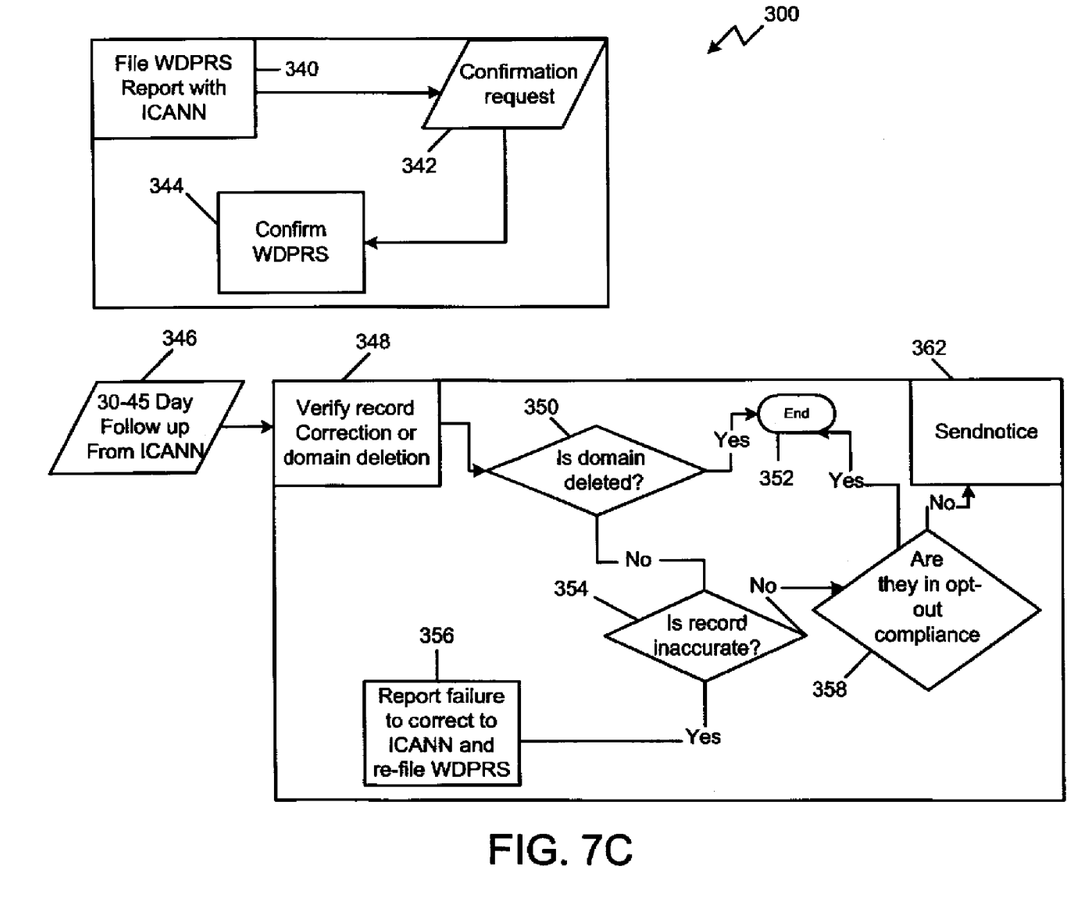

In FIG. 7C, when the report is filed (block 340), confirmation is requested (block 342) and granted (block 344). After a period of days (block 346), records are verified (block 348). If the domain is deleted (block 350), the process ends (block 352). If the domain is not deleted, record accuracy is checked (block 354) and another inaccuracy results in another report filing (block 356). If the record is accurate, compliance with the opt-out request is checked (block 358). Compliance ends the process (block 352) and non-compliance results in another input to sendnotice (block 362).

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of identifying and reporting improperly registered web sites, comprising the steps of:
 receiving unwelcome mail;
 extracting a Universal Resource Locator for the unwelcome mail;

querying a database for ownership data for the extracted Universal Resource Locator, the ownership data including an owner email address for an owner of the extracted Universal Resource Locator; and sending a message to the owner email address requesting a stop to the unwelcome mail.

2. The method of claim 1, further comprising the steps of:

receiving a rejection of the message to the owner email address requesting a stop to the unwelcome mail thereby indicating the ownership data for the extracted Universal Resource Locator is invalid; and reporting the invalid data to a proper authority.

3. The method of claim 2, further comprising the step of storing the invalid data reported to the proper authority in a storage device.

4. The method of claim 2, further comprising the step of storing a copy of the message sent and information regarding the rejection in a storage device.

5. The method of claim 1, further comprising the step of storing a copy of the message sent in a storage device.

6. The method of claim 1, wherein the step of querying a database further comprises querying a public Whois database.

7. The method of claim 1, wherein the step of querying a database further comprises querying a private database.

8. The method of claim 1, further comprising the steps of:

detecting whether the URL has been obfuscated; and de-obfuscating the URL if obfuscation is detected.

* * * * *